United States Patent [19]
Jones et al.

[11] Patent Number: 5,788,372
[45] Date of Patent: Aug. 4, 1998

[54] METHOD AND APPARATUS FOR REDUCING TRANSIENT MOTION BETWEEN AN AIRCRAFT POWER MEMBER AND STRUCTURE DURING TAKEOFF, LANDING AND MANEUVERS

[75] Inventors: Peter J. Jones; Dennis P. McGuire, both of Erie, Pa.

[73] Assignee: Lord Corporation, Cary, N.C.

[21] Appl. No.: 644,147

[22] Filed: May 10, 1996

[51] Int. Cl.$^6$ .................. F16M 1/00; F16F 7/10; F16K 15/00
[52] U.S. Cl. .................. 267/136; 267/293; 188/379; 137/513.3; 137/517
[58] Field of Search .................. 188/380, 378, 188/379; 267/140.13, 292–294, 140.11, 136, 140; 137/513.3, 517, 529, 614.21; 244/54

[56] References Cited

U.S. PATENT DOCUMENTS

| | | | |
|---|---|---|---|
| 2,705,118 | 3/1955 | Beck | 248/10 |
| 3,122,162 | 2/1964 | Sands | 137/513.3 X |
| 4,159,091 | 6/1979 | Le Salver et al. | 248/562 |
| 4,215,842 | 8/1980 | Brenner et al. | 248/562 |
| 4,236,607 | 12/1980 | Halwes et al. | 188/1 B |
| 4,262,886 | 4/1981 | Le Salver et al. | 267/8 R |
| 4,377,216 | 3/1983 | Ueno | 180/73 TL |
| 4,416,445 | 11/1983 | Coad | 267/35 |
| 4,483,521 | 11/1984 | Kakimoto | 267/8 R |
| 4,562,861 | 1/1986 | Payton | 137/513.3 X |
| 4,611,782 | 9/1986 | Ushijima et al. | 248/562 |
| 4,613,118 | 9/1986 | Morita | 267/140.1 |
| 4,679,778 | 7/1987 | Tabata et al. | 267/140.1 |
| 4,720,087 | 1/1988 | Duclos et al. | 267/140.1 |
| 4,738,434 | 4/1988 | Marjoram et al. | 267/140.1 |
| 4,753,422 | 6/1988 | Thorn | 267/140.1 |
| 4,762,306 | 8/1988 | Watanabe et al. | 267/195 |
| 4,811,756 | 3/1989 | Hall | 137/517 X |
| 4,811,919 | 3/1989 | Jones | 244/54 |
| 4,858,899 | 8/1989 | Saotome et al. | 267/219 |
| 4,969,632 | 11/1990 | Hodgson et al. | 267/140.1 |
| 5,054,752 | 10/1991 | Tabata | 267/140.1 |
| 5,116,029 | 5/1992 | Gennesseaux | 367/140.1 |
| 5,127,607 | 7/1992 | McGuire | 244/54 |
| 5,174,552 | 12/1992 | Hodgson et al. | 267/140.11 |
| 5,197,692 | 3/1993 | Jones et al. | 244/54 |
| 5,249,652 | 10/1993 | Leitzman et al. | 188/282 |
| 5,374,039 | 12/1994 | Schmidt et al. | 267/140.13 |
| 5,388,811 | 2/1995 | Marjoram | 267/140.13 |
| 5,413,320 | 5/1995 | Herbst | 267/140.13 |
| 5,439,082 | 8/1995 | McKeown et al. | 188/379 |

FOREIGN PATENT DOCUMENTS

| | | | |
|---|---|---|---|
| 286 362 A2 | 10/1988 | European Pat. Off. | |
| 50330 | 12/1939 | France | 137/513.3 |
| 3544613 A1 | 6/1986 | Germany | |
| 2 070 730 | 2/1981 | United Kingdom | |
| 2 192 692 | 7/1986 | United Kingdom | |

*Primary Examiner*—Peter M. Poon
*Attorney, Agent, or Firm*—Randall S. Wayland; James W. Wright

[57] ABSTRACT

A method and apparatus is described for limiting transient motions between an aircraft power member and aircraft structure. The apparatus incorporates a coupler (20) for use with inertial-type mounts and includes a body portion (21) having a coupler piston (32) telescopically received therein. Upon exceeding a transient relative motion which causes a fluid flow velocity to be exceeded, seat (38) formed on coupler piston (32) interacts with lip (39) on body portion (21) to cause a fluid flow restriction. This method and apparatus restricts and limits transient motions, i.e., acts as a snuffer, to limit further relative motion between an aircraft power member (54) and an aircraft structural member (52). The coupler piston (32) preferably includes a flexible seal (38) formed thereon and orifice (40) therethrough for providing additional throttle-type damping upon snubbing. This method and apparatus is particularly useful in inertial-type fluid mounts for mounting aircraft engines, fluid pylon isolators for helicopter pylon isolation, and Fluid Torque Restraint (FTR) systems for aircraft for limiting transient motions under certain conditions, such as during takeoff, landing, and maneuvers, yet providing isolation under normal operating conditions.

16 Claims, 4 Drawing Sheets

METHOD AND APPARATUS FOR REDUCING TRANSIENT MOTION BETWEEN AN AIRCRAFT POWER MEMBER AND STRUCTURE DURING TAKEOFF, LANDING AND MANEUVERS

FIELD OF THE INVENTION

This invention relates to the area of methods and apparatus for flexibly connecting an aircraft power member to an aircraft structural member and controlling motion therebetween. Specifically, the invention relates to fluid mounts for aircraft use.

BACKGROUND OF THE INVENTION

Fluid mountings for flexibly attaching a vibrating member, such as an engine, to a supporting member, are known. One such system is described in the commonly assigned U.S. Pat. No. 2,705,118 to Beck entitled "Mounting System." The Beck '118 patent, which is hereby incorporated by reference herein, relates to a resilient mounting system which uses an incompressible fluid or liquid 6 to obtain a low stiffness in one direction, for instance, in vertical translation, yet provide a high stiffness in the torsional direction. A high torque stiffness is desirable for restraining operating torque of an engine 17, and low vertical stiffness provides excellent vertical vibration isolation. Furthermore, the damping can be variable by adjusting valve 10. Although this system was a great advance in its time, it could only provide a relatively constant damping coefficient which is undesirable for some applications, such as those requiring a tuned fluid inertia effect, i.e., a tuned fluid mass for normal operating conditions (lack of damping).

U.S. Pat. No. 4,159,091 to Le Salver et al. entitled "Damper Device, In Particular For The Suspension Of An Engine" teaches a device which includes a partition wall 13 and at least one calibrated orifice 14. The partition wall 14 is, at least in part, moveable with respect to a first armature 5 and a second armature 6, and the motion is limited thereby. Further embodiments, such as that shown in FIG. 13 of the '091 patent, allow the partition to flexibly attach by way of an elastomeric connection to the armatures. However, the elastomeric connection inherently adds unwanted damping and unwanted non-linearity to the system. Moreover, the device is primarily a damper and not designed for providing a tuned inertial effect.

Commonly assigned U.S. Pat. No. 5,374,039 to Schmidt et al. entitled "Fluid-And-Elastomer Support Device", which is hereby incorporated by reference herein, describes an elastomer and fluid device comprising a series of passageway assemblies 80a and 80b which further include spring-operated pressure relief valves to protect the device from high pressures that may build up. When the mounting is subjected to high pressures due to high amplitude conditions or due to low temperatures which change the fluid viscosity, the flow area is resultantly increased to relieve those pressures. This is accomplished by having valves open if a preset design pressure is exceeded. Each valve is one-way acting to provide linearity in both directions of motion. Again, this device is primarily a damper and does not include a mechanism for providing coupling.

Commonly assigned U.S. Pat. No. 5,127,607 to McGuire entitled "Fluid Torque-Restraint System With Optimized Fluid Expansion", which is hereby incorporated by reference herein, teaches a Fluid Torque Restraint (FTR) having optimized fluid expansion to substantially counteract displacements caused by operating torques. The improvement is a system which is realigned to the non torqued orientation, thus allowing a larger range of vertical motions of the system before snubbing occurs. However, this system lacks any means to limit motion and prevent hitting the hard stops upon encountering severe transient impacts, such as encountered during landing.

Commonly assigned U.S. Pat. No. 4,811,919 to Jones entitled "Volume Compensated Fluid Mount", which is hereby incorporated by reference herein, describes an inertial-type fluid mounting with means for accommodating fluid expansion due to temperature increases. The device includes an external inertia track, thereby allowing tuning of the fluid inertia to change fluid inertia characteristics. However, the device doesn't include means for limiting displacement across the mounting or adding the damping under certain operating conditions.

U.S. Pat. No. 4,236,607 to Halwes entitled "Vibration Suppression System", which is hereby incorporated by reference herein, describes a vibration isolator specifically adapted for attachment between a helicopter pylon and fuselage and including a fluid passageway 44 containing a liquid which functions as a "tuning mass" to generate amplified-counter-inertial forces as a result of relative movement between the pylon and fuselage. Although, this is a tuned fluid inertia device, the device lacks any means for limiting the motions between the helicopter pylon and fuselage.

SUMMARY OF THE INVENTION

Therefore, the present invention relates to a method and apparatus for limiting transient displacements between an aircraft power member and an aircraft structural member. The invention utilizes a coupler having a telescopically or slidably-received coupler piston housed within a body portion, in conjunction with an inertial-type fluid mount or interconnected fluid tuned isolators. The invention is useful for coupling an aircraft structural member to an aircraft power member upon encountering large enough transient load conditions, such as during takeoff, landing, and maneuvers. The coupler may provide a high level of damping upon snubbing or a high level of stiffness, or both, while the fluid mount is subjected to large amplitude transient conditions, yet the internal coupler is free-floating (only a light spring restraint) and imparts only minimal damping while under normal operating conditions. Therefore, the coupler does not appreciably affect any tuned inertial effect which is desired during normal operation. In particular, the coupler is placed in series-relationship with the fluid pathway which provides the tuned fluid inertia effect. The method and apparatus including a coupler has particular applicability with Fluid Torque Restraint (FTR) systems, helicopter fluid pylon isolators, and fluid mounts for aircraft to limit transient motions between the aircraft power element and the aircraft structural element during such transient conditions as takeoff, landing, and maneuvers.

It is an advantage of the present invention apparatus and method including coupler that it can provide low damping for improved isolation of the power element, yet provide high damping and/or stiffness when desired, for limiting transient motions due to transient or impact-type high load conditions between the aircraft power element and the aircraft structural element.

It is an advantage that the method and apparatus, when used in conjunction with an aircraft Fluid Torque Restraint (FTR) system, that it can limit the transient aircraft vertical engine motions encountered during large vertical load conditions, such as during aircraft takeoff, landing, and maneuvers.

It is an advantage of the method and apparatus when used within a fluid inertial-type engine mount system supporting an aircraft engine that it can produce large damping forces to limit engine motions during blade-out conditions or other high-load input transient conditions by adding damping to minimize the transmissibility at resonance.

It is an advantage that the method and apparatus, when used within a helicopter fluid pylon isolator system, that it can limit the maximum vertical transient motions of the helicopter pylon relative to the fuselage during takeoff, landing, or large-load maneuvering conditions.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE INVENTION

Figures 1A, 1B:
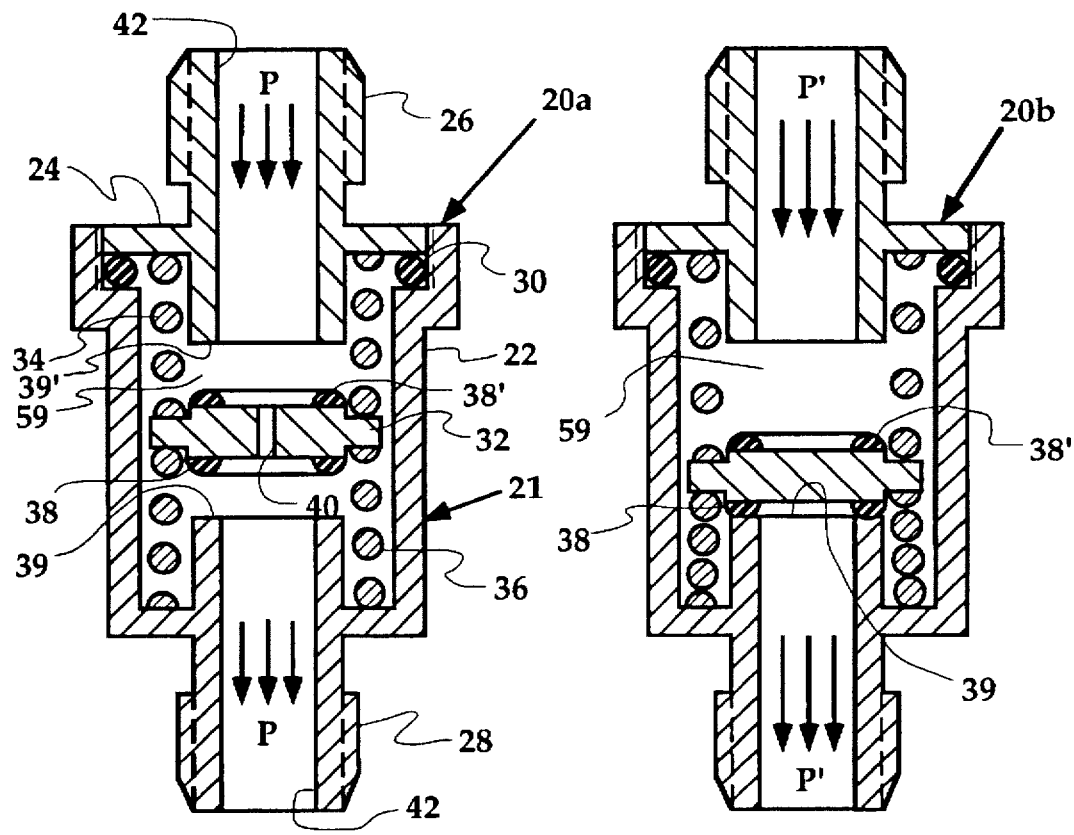
FIG. 1a is a cross-sectioned side view of one embodiment of a coupler.
FIG. 1b is a cross-sectioned side view of another embodiment of a coupler shown as snubbed.

Referring now to the Drawings where like numerals denote like elements, in FIG. 1a, shown generally at 20a, is a first embodiment of the present invention including a coupler for use in an inertial-type fluid mount or like apparatus for limiting the transient motions encountered thereby. This embodiment of coupler 20a is useful for attaching to, or use with an apparatus or device including an inertia track, and is comprised of a body portion 21, preferably metal, which is made up of a housing 22, and a cap 24, and including optional first threaded member 26, and a second threaded member 28 to allow connection to an inertia track of a inertial-type fluid mount, or the like. By inertial-type fluid mount it is meant to include only devices that have a tuned fluid inertia effect (devices where parasitic fluid damping is not desired for normal operating conditions). A seal 30, which is preferably an elastomeric o-ring, acts as the means for sealing the coupler 20a when used externally and keeps the inertial fluid 59 contained within that localized portion of the fluid pathway 42 from escaping.

The coupler 20a preferably includes a coupler piston 32 which is either disc-like or piston-like (piston-like if a bearing surface is required to prevent cocking in the specific application), that is substantially free-floating, i.e., free to move axially within the body portion 21 with only minimal restraining force, and which is preferably substantially rigid and manufactured from a metal or rigid plastic material. The outer periphery of the coupler piston 32 may be coated with a friction-reducing treatment to allow easier telescopic movement within the body portion 21.

In this embodiment, the coupler piston 32 is preferably supported and positioned within, and relative to, the body portion 21 by at least one spring, and in this case, by first and second springs 34 and 36, which are preferably metal coil-type springs. Preferably, the springs 34 and 36 are precompressed within the body portion, such that the coupler piston 32 is spring-preloaded and centered. The coupler piston 32 is considered free-floating because only the small/ light spring force must be overcome to move the coupler piston 32. Also, the metal spring imparts only minimal damping (damping is preferably minimized in inertial-type devices). The coupler piston 32 optionally may include a small diameter orifice 40 therethrough for providing throttling of the inertial fluid 59 upon snubbing, and thus, provide high damping and/or transient motion limitation only after the snubbing occurs.

Snubbing of the coupler piston 32 occurs upon reaching a high enough fluid velocity and magnitude resulting from high transient motions acting across the mount. The normal fluid flow due to vibratory inputs is designated as P. Under normal operating conditions and normal fluid flow, the coupler piston 32 will oscillate generally in phase with the fluid within the body portion 21. For example, under normal dynamic conditions, the coupler piston will be oscillating less than about +/− about 0.05 inch. The disc 32 will not snub under any ordinary dynamic conditions (such as, landing pattern, cruise, or high speed flight) and only minimal parasitic damping will be added to the system. The coupler 20a preferably includes lips 39 and 39' and seats 38 and 38' which will be described with reference to FIG. 1b and which together cooperate to cut off fluid flow around the coupler piston 32 upon making intimate contact. Tapered or conically-shaped seats may be desirable for some applications.

FIG. 1b illustrates another embodiment of coupler 20b reacting to a large input or transient load that has been applied to the system. When a large transient load condition is encountered, the fluid velocity and displacement acting on the coupler piston 32 will displace the coupler piston 32 in the direction of fluid flow as indicated by larger arrows P'. Upon encountering a large enough fluid velocity in the inertial fluid 59, the coupler piston 32 will deflect in the direction of fluid flow to cause seat 38 to make substantial contact with lip 39. This seals the inertial fluid pathway 42, in this embodiment, such that no additional inertial fluid 59 flows upon increasing the velocity. This coupling action acts to limit the displacement across the inertial-type fluid mount as compared to an unrestricted inertial fluid pathway 42, and is herein referred to as snubbing. This type of snubbing is desirable and comprises a method for snubbing transient motions due to impact loads, large maneuver loads, and system resonances. It should be understood that snubbing will not occur during any normal operating condition.

In the embodiment of FIG. 1b, there is no orifice to provide additional damping upon snubbing. Therefore, in this embodiment, maximum stiffness increase is accomplished upon initiation of snubbing to help limit transient motions/inputs and the like. The FIG. 1a embodiment allows added damping upon initiation of snubbing by a throttling of the inertial fluid 59 through small diameter orifice 40. It should be understood that the orifice 40 is made small enough such that very little inertial fluid 59 flows through the orifice 40 during normal operating conditions. Adding damping, upon the occurrence of snubbing may, for example, be used to control resonances of an aircraft engine or resonances of a helicopter (ground resonance) during landing, etc.

Figure 2:
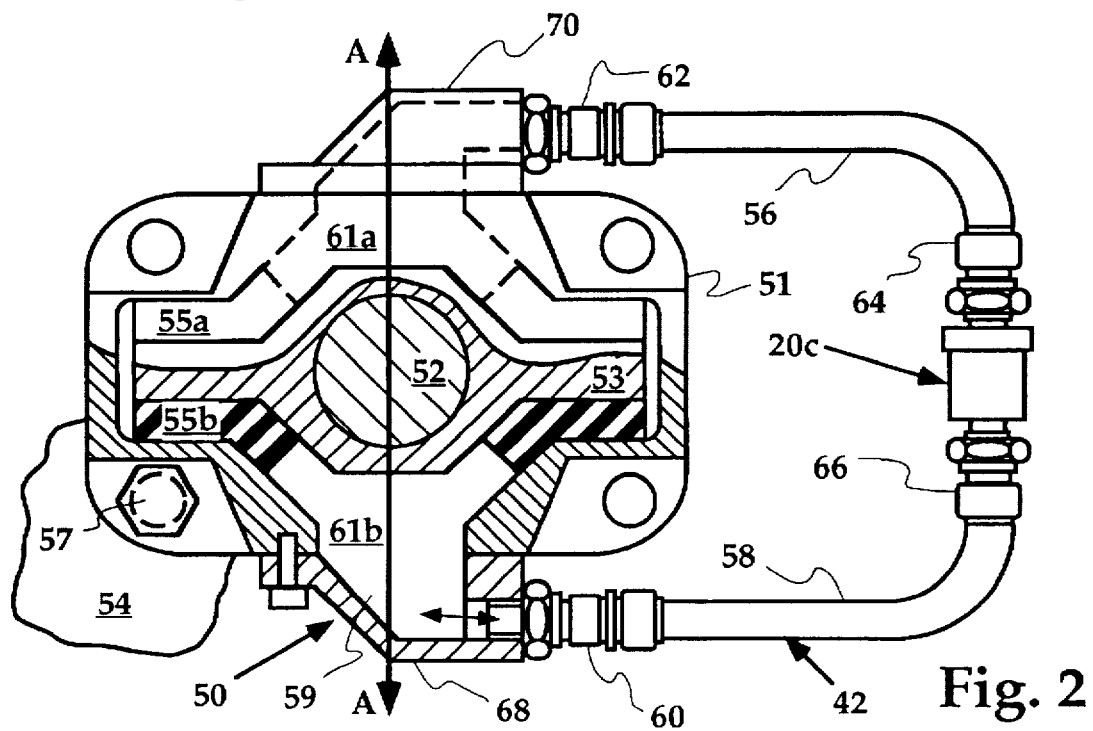
FIG. 2 is a frontal view of a coupler installed in the environment of an aircraft fluid mounting with an external inertia track which supports an aircraft engine relative to an aircraft structure.

FIG. 2 is an illustration of the coupler 20c installed in an aircraft fluid mount 50. The fluid mount 50 is an inertial-type and is installed to flexibly mount the aircraft structural member 52, such as an airframe, pylon, strut, or the like to the aircraft power member 54, such as a jet engine, turboprop engine, ducted or ductless fan engine, turbofan engine or the like. A fluid mount 50 similar to that shown, yet lacking the coupler 20c, is described in U.S. Pat. No. 4,811,919 to Jones. The inertial-type fluid mount 50 incorporating a coupler 20c includes a rectangularly-shaped outer member housing 51 for attaching to the aircraft power member 54 by way of fasteners 57 (only one is shown), an inner member 53 for attaching to the aircraft structural member 52, such as the snub shaft shown, and flexible elements 55a and 55b flexibly interconnecting the housing 51 and inner member 53. Flexible elements 55a and 55b are preferably bonded elastomer sections and act as vertical and lateral isolator springs. Further, flexible elements 55a and 55b define the fluid chambers to be described later.

Relative movement between the inner member 53 and the outer member housing 51 along the direction of axis "A—A" (vertical axis) causes an inertial fluid 59 to flow through the first and second tubes 56 and 58, which make up a portion of the fluid pathway 42. The fluid pathway 42 is otherwise referred to as the inertia track. The physical parameters of the inertia track are tuned to provide amplified inertial forces to improve vibration isolation within a predetermined frequency range. This frequency range generally coincides with a common or predominant operating frequency of the aircraft power member 54, such as the cruise frequency.

In this embodiment, connectors 60 and 62 connect first and second tubes 56 and 58 to chamber caps 68 and 70. Likewise, connectors 64 and 66 connect the coupler 20c to tubes 56 and 58. Collectively, the passages in the caps 68 and 70, passages in connectors 60, 62, 64, and 66, passages in tubes 56 and 58, and passages in the coupler 20c form the fluid pathway 42 which confines the inertial fluid which defines the physical extent of the inertia track. Typical tubing for this type of external inertia track is polytetrafluoroethylene (PTFE)-lined and metal-braided and reinforced hose, or the like. First and second fluid chambers 61a and 61b are defined by recessed portions formed during bonding of flexible elements 55a and 55b in cooperation with the caps 68 and 70. The fluid chambers 61a and 61b include a volume stiffness which is one factor that is determinative of the natural frequency fn of resonance of the inertial fluid 59.

In operation, if the relative input amplitude (engine vibration) is small, for example +/–0.0005 inches to +/–0.002 inches (which would be typical of an aircraft engine vibration level) then the coupler piston 32 is thought to generally oscillate in phase with the flow of the inertial fluid 59 contained in the fluid pathway 42. Minimal damping is imparted and a well defined inertial effect (such as a fluid notch effect) will be present. However, when the relative amplitude between the inner member 53 and outer member housing 51 is large enough, such as encountered during large, lowerfrequency transient conditions, large loads and motions are applied to the fluid mount 50, the coupler piston 32 will bottom on lip 39 (FIG. 1a and FIG. 1b) and any further fluid flow will be restricted. Fluid flow will be cut off, either completely (as in FIG. 1b), if a very high stiffness is required, or only partially (as in FIG. 1a), if high damping is required. The design goal, i.e., damping or high stiffness upon snubbing will determine if an orifice is ultimately required. By adding an appropriately-sized orifice 40 to the coupler piston 32, large amounts of throttled flow damping can be added, such that certain resonant conditions can be controlled. For example, the damping of the system could be dramatically increased, upon snubbing, such as to control a blade-out condition encountered as a result of loss of a whole, or a portion of, the blade of an aircraft engine. By transient conditions, it is generally meant to include conditions that are larger than normal operating conditions.

Generally, the spring rate characteristics of the springs 34 and 36 of the coupler 20a, 20b, and 20c are linear as a function of displacement and relatively soft so as to only provide centering, positioning or the like. Further, because the metal springs 34 and 36 exhibit very low damping (tan delta), the movement of the coupler piston 32 is not damped thereby. In operation, under normal conditions, very little damping would be imparted into the system with the use of these springs. Design of the shape of the coupler 20c would be to minimize the damping. Therefore, only after snubbing occurs will large amounts of damping and/or stiffness be added to the system. During normal operating conditions, it is desirable to have minimized damping to provide maximum isolation. This could be accomplished by using low stiffness or no springs at all with the coupler 20c.

Figure 3:
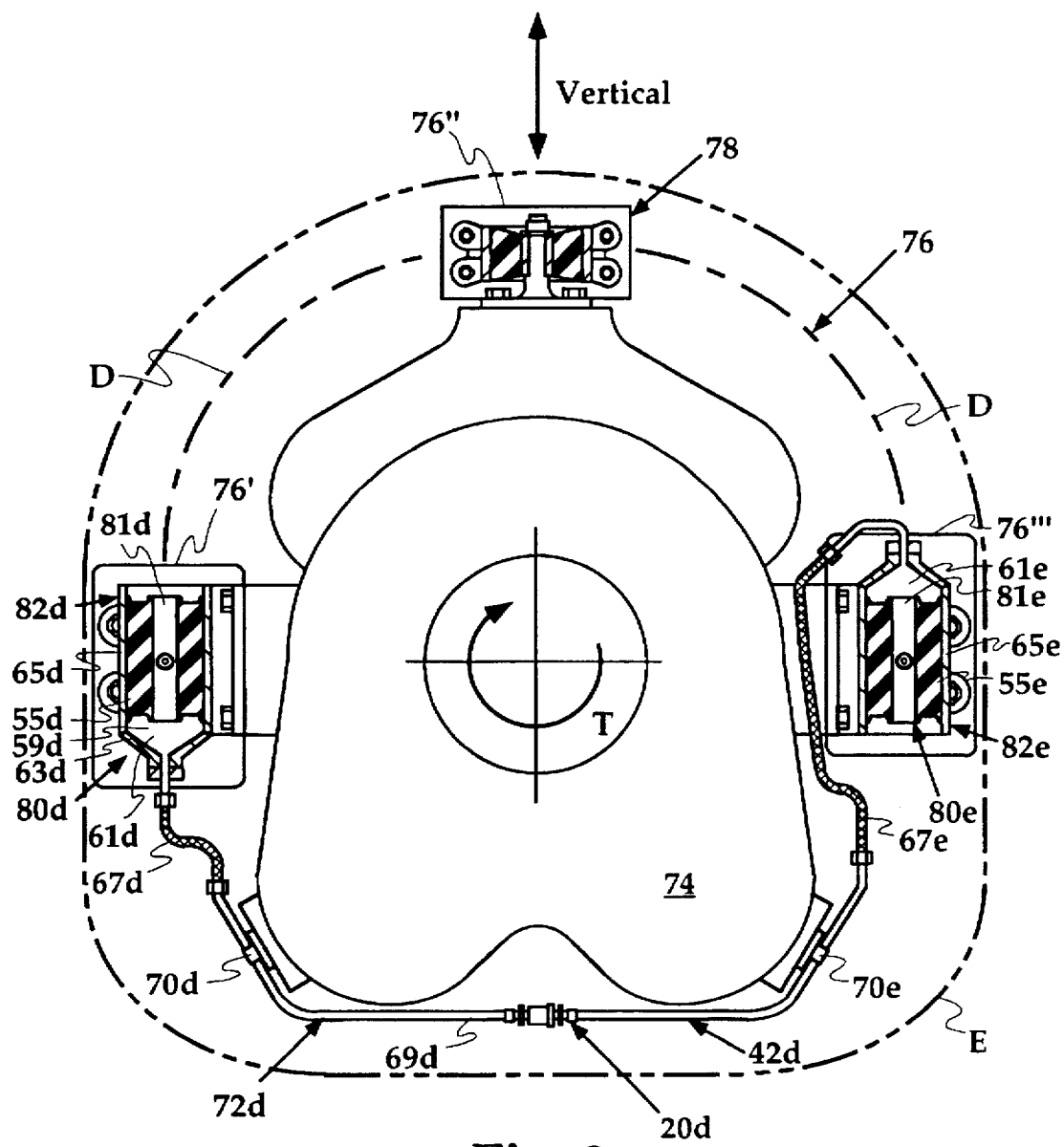
FIG. 3 is a frontal and partially cross-sectioned view of a Fluid Torque Restraint (FTR) system incorporating a coupler in the inertia track for limiting vertical transient motions.

FIG. 3 illustrates the use of the coupler 20d within the environment of an aircraft Fluid Torque Restraint (FTR) 72d. An FTR 72d restrains the torque acting between an aircraft power element 74 and an aircraft structural member 76. In other words, the FTR 72d is relatively stiff in the torque direction indicated by arrow T. However, the FTR 72d is relatively soft in the vertical direction, such that vertical dynamic motions of the engine are isolated within the operating range. For example, a typical operating range would be between about 15 Hz (cruise) and 18 Hz (takeoff). The structural member 76 includes structural connection points 76', 76", and 76'", which are rigidly interconnected by structural frame members (not shown), as is indicated by dotted line D. FIG. 3 shows an aircraft engine installation which preferably includes a third mount 78 for supporting the aft portion of the engine.

The FTR 72d, which is a type of fluid mounting, is made up of a first fluid mount member 80d and a second fluid mount member 80e and interconnecting inertial fluid pathway 42d. The first fluid mount member 80d includes an inner member 81d and an outer member 82d which are flexibly interconnected by flexible elements 55d. Outer member 82d includes a body 65d for attachment to the vibrating member 74 and a cap 63d welded thereto to seal, form, and define the fluid chamber 61d. Inner members 81d and 81e connect to structure 76 at structural connection points 76' and 76'" via bolts or the like. The first fluid chamber 61d is formed by the inner member 81d, flexible member 55d, and outer member 82d. Likewise similar elements are included in the second fluid mount member 80e and are denoted by like numerals.

Flexible hoses 67d and 67e, located in a portion, or all of, the inertial fluid pathway 42d allow for relative motion between the structural member 76 and the aircraft engine 74, if required. The fluid inertia (mass) within the fluid pathway 42d is preferably tuned in conjunction with the elastomer stiffness, and other parameters, to provide a tuned fluid inertia effect (such as a fluid stiffness notch, i.e., a reduction in the dynamic stiffness within a particular frequency range) which preferably resides between the cruise and takeoff frequencies of the aircraft. In this manner, the fluid mount is operating in the notch for these conditions and vibration isolation is accomplished.

The notch stiffness and location, i.e., the magnitude of the dynamic stiffness as a function of frequency, can be tuned by adjusting the length L and diameter d of the inertial fluid pathway 42d, the density rho of the inertial fluid 59d, the volume stiffness Kv of the compliance defined by the flexible elements 55d and 55e and to a lesser extent by varying the kinematic viscosity υ of the inertial fluid 59d as well as the damping level of the compliance. This tuned fluid inertial effect provides improved isolation at the tuned frequency. A rigid portion 69d of pathway 42d attaches to vibrating member 74 via clamps 70d and 70e and preferably includes the coupler 20d within. A coupler 20d similar to either FIG. 1a or FIG. 1b may be used. Notably, the coupler 20d may be placed elsewhere in series relationship to the flow of the inertial fluid 59d.

In operation, the FTR 72d provides improved vibration isolation by having the fluid inertia (mass) tuned to cancel, or at least partially nullify, vibrations at or near the operating frequency of the aircraft. Further, when large transient vertical loads (impacts or other transient motions) are encountered, such as at landing, the coupler 20d will internally snub and provide a high stiffness and/or damping to further limit vertical motions of the vibrating member 74 relative to the structure 76. This is because vertical downward motion of the vibrating member 74 causes inertial fluid 59d contained within the first fluid chamber 61d to flow through the fluid pathway 42d and then into the second fluid chamber 61e. Large enough motions, such as encountered at landing, will cause the coupler 20d to internally snub as shown in FIG. 1b, thus causing a high stiffness and/or damping and a method to further limit relative vertical motion between the structure and vibrating member.

Limiting this motion is desirable in aircraft, as the sway space envelope requirements between the cowl and the engine may be reduced, thereby reducing overall size and aircraft frontal drag profile. If the configuration of FIG. 1a is used, then a high damping coefficient is achieved upon snubbing, to damp any further motion. This is desirable in FTR applications, especially upon landing. If the engine system has a low frequency resonance (10 hz or less vertical mode), as do most soft-mounted engine systems, then the landing impact may act as an impulse function and may excite some or all resonant modes of the engine. Added damping is desired to damp any resonance that may be excited. Damping the system resonance will limit (restrict) the transient motions of the engine.

In particular, in many engine systems, there is a system mode at about 9 Hz. A hard-landing impact may excite this mode, and thereby cause large transient unwanted motions of the engine at that frequency. The present invention, including a coupler, provides a method and apparatus to damp motion of this low-frequency (9 Hz) mode. It should be recognized that under normal dynamic conditions, no snubbing will occur. By way of example, a typical FTR 72d may have the following parameters.

Example:

Dt=0.39 inch (Inertial Track Diameter)

At=0.12 inch squared (Track Area)

Ap=6.8 inch squared (Piston Area)

Ap/At Ratio=56.6 (Area Ratio)

DD=0.0005–0.005 inch range (Dynamic Displacement Range)

Therefore, for example, at the 15 Hz cruise frequency, for the most unbalanced engine expected, the coupler piston would be dynamically oscillating at between about +/−0.03 and +/−0.28 inch. At takeoff, that value may rise toward the high end of the range. However, transient motions might be as high as 0.3 inch at the engine (over 150 times the maximum expected dynamic motion). Therefore, it is desired to snub transient motions and not snub at normal dynamic operating motions. Therefore, the stops would be set at about +/−0.57 inch or greater. This setting would initiate snubbing at about +/−0.01 inch transient engine motion. Therefore, it should be recognized that in no event would snubbing of the coupler occur during normal dynamic operating conditions, such as cruise or takeoff, but would only occur when large transient motions or conditions are encountered. This is accomplished by setting the stops at a dimension that allows snubbing of transient conditions, but not of normal dynamic motions.

As should be recognized, the coupler 20d may also be located along other areas of the fluid pathway 42d, such as at the entrance to the chambers 61d or 61e and accomplish the same function. Further, the attachment details could also be varied. For example, the outer members 82d and 82e could be attached to the structure 76 and the inner members 81d and 81e could be attached to the vibrating member 74. The dotted line designated E simply defines the engine cowl of the aircraft, viewing front to aft.

Figure 4:
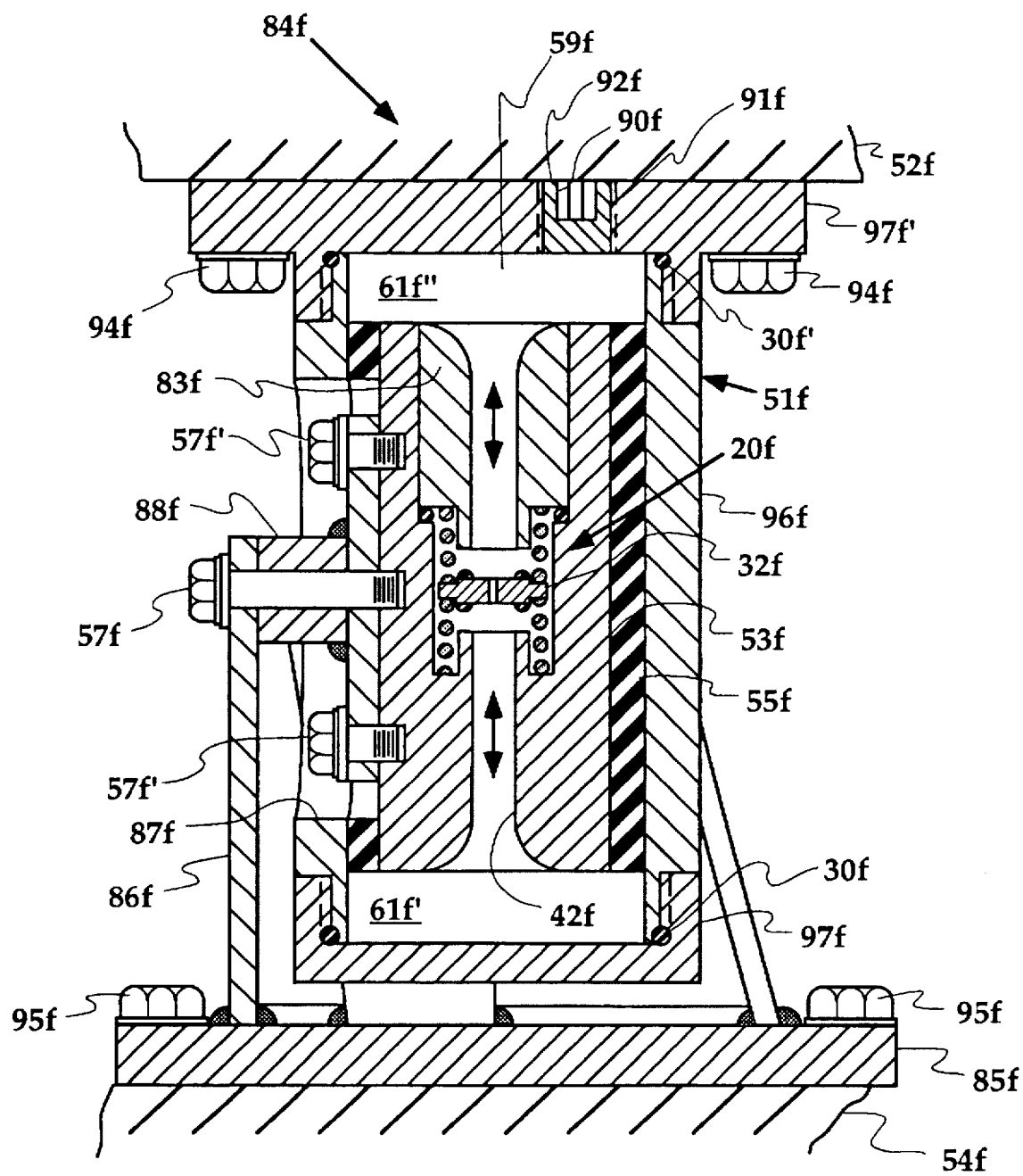
FIG. 4 is a side cross-sectioned view of a pylon isolator mounting incorporating a coupler in the inertia track attached between a helicopter fuselage and a helicopter pylon.

FIG. 4 illustrates an apparatus using the coupler 20f within the environment of a helicopter fluid pylon isolator 84f. A fluid pylon isolator 84f attaches between the pylon (connects the transmission to the fuselage) and fuselage of a helicopter. Generally, isolator 84f isolates the fuselage from noise and vibration generated by the rotor system and transmission of the helicopter. In this embodiment, the fluid pylon isolator 84f attaches between the supported member 54f (the helicopter fuselage) and the supporting member 52f (the helicopter pylon). It is desirable to have high damping upon encountering motions due to hard landings or large abrupt maneuvers, and to a lesser extent, a ground resonance condition in a helicopter. Therefore, in another aspect, the present invention is a method and apparatus for reducing transient motions between a helicopter fuselage and a helicopter pylon or transmission.

The fluid pylon isolator 84f is comprised of an inner member 53f, which is preferably substantially cylindrical and which attaches to the supported member 54f (the helicopter fuselage) by way of bracket 85f and spacers 88f (only one is shown). Bracket 85f is fastened to fuselage by way of bolts 95f and three equally-spaced bracket flanges 86f (only two are shown) are attached to inner member 53f at three locations (only one attachment location is shown) by way of a spacer 88f and fasteners 57f and 57f'. An outer member housing 51f attaches to the supporting member 52f (the helicopter pylon) by attachment means such as bolts 94f.

The outer member housing 51f is made up of a center 96f and first and second ends, 97f and 97f', respectively. The first and second ends 97f and 97f' close the pocket formed by the center 96f, inner member 53f, and flexible element 55f and form first and second fluid chambers 61f' and 61f", respectfully. Seals 30f and 30f', which are preferably elastomeric o-ring type, seal the inertial fluid 59f contained within, and substantially filling, the fluid chambers 61f' and 61f" and fluid pathway 42f within the fluid pylon isolator 84f.

The flexible element 55f is integrally bonded between the inner member 53f and the center 96f of outer member housing 51f and forms a fluid impermeable seal therebetween. Flexible element 55f is preferably manufactured from low-damped natural rubber or natural rubber blend and has a preferably hollow cylindrical or sleeve-like shape. The flexible element 55f is cored-out radially in three equally-spaced local portions through windows 87f in the outer member housing 51f to allow the spacers 88f to attach to the inner member 53f thereat.

In this embodiment, the inner member 53f includes within it, a coupler, 20f. The details of the coupler 20f are similar to that described relative to FIG. 1a. However, since the coupler 20f is internal rather than external, the threaded members are not needed. In this embodiment, the coupler piston 32f of coupler 20f is positioned and springs are precompressed by press-fitting inertia track segment 83f into a pocket formed in the inner member 53f. The fluid pylon isolator 84f is filled by adding inertial fluid such as glycol, silicone fluid, or other high density, substantially incompressible fluid or the like into the fill plug hole 91f and sealing with threaded fill plug 92f having hex 90f formed therein. A sealant, o-ring or the like would be required on the threads.

The inertial fluid forces are generated in a similar fashion as in the inertial fluid mount of FIG. 2 and the FTR of FIG. 3. Relative motion between the supporting member 52f and the supported member 54f cause relative motion between the inner member 53f and outer member housing 51f. This causes inertial fluid 59f to flow between the chambers 61f' and 61f". If the motion is large enough, i.e., of the appropriate magnitude and velocity, such as during abrupt maneuvering, takeoff, or landing, the coupler piston 32f will snub due to high fluid velocities generated as shown in FIG. 1b and the motion between the helicopter fuselage and the helicopter pylon will be further restricted (if the FIG. 1b configuration is used) and/or a high level of damping may be added (if the FIG. 1a configuration is used). Depending on the application, an orifice may not be desired. The diameter of the orifice would be tuned to provide the appropriate amount of damping upon snubbing.

Figure 5A:
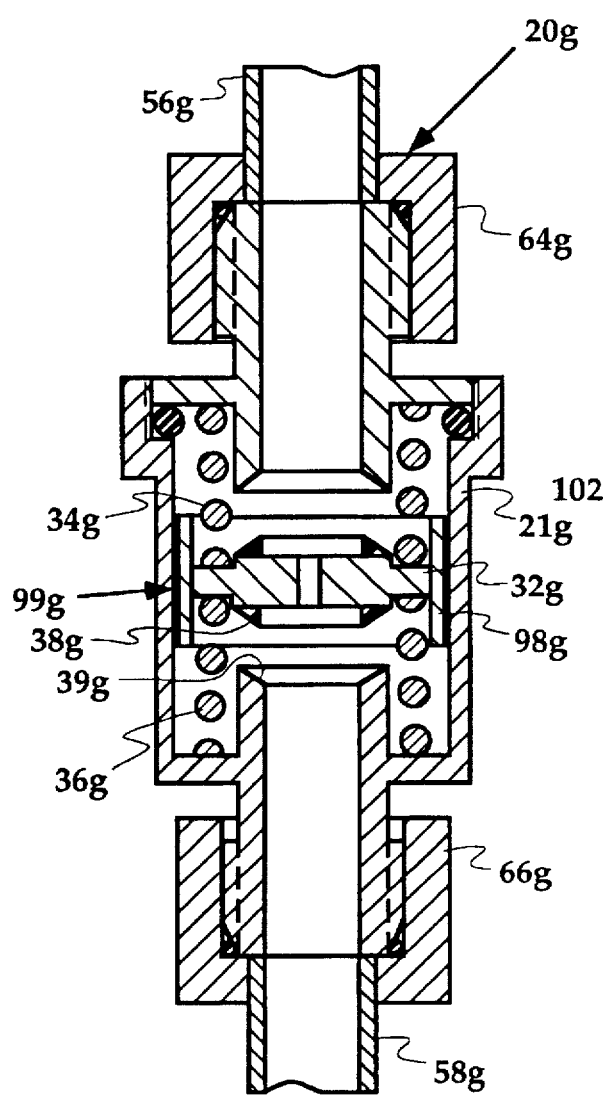
FIG. 5a is a cross-sectioned side view of another embodiment of coupler.

FIG. 5a illustrates another embodiment of coupler 20g. This coupler is similar to the embodiment of FIG. 1a in that it includes a coupler piston 32g which is telescopically or slidably-received in the body portion 21g. Preferably, metal springs 34g and 36g support and center the coupler piston 32g. The coupler piston 32g has attached thereto, a sleeve 98g, which is preferably a selflubricating composite material. Together, the coupler piston 32g and sleeve 98g form a piston-like member 99g. The elongated tube-like shape of the sleeve 98g also functions to reduce the level of cocking of the coupler piston 32g relative to the body portion 21g experienced upon movement. Connectors 64g and 66g are shown for attaching the coupler 20g to the tubes 56g and 58g. The seat 38g and lip 39g are conical in shape in this embodiment and are manufactured from elastomer material, such as natural rubber or the like. Notably, this type of device may also be used internally in devices similar to the Pylon Isolator of FIG. 4.

Figure 5B:
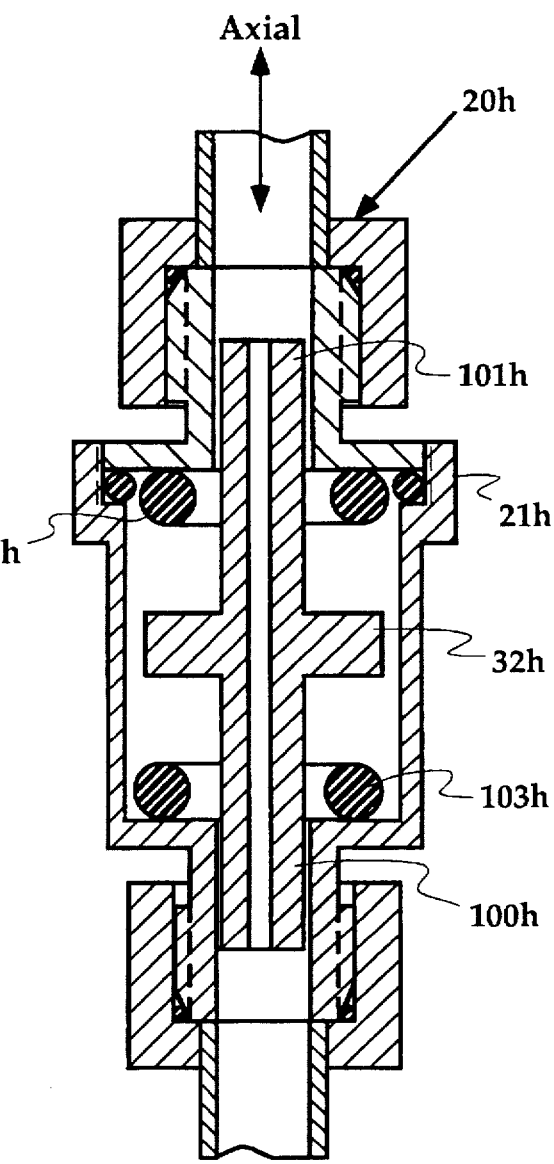
FIG. 5b is a cross-sectioned side view of yet another embodiment of coupler.

FIG. 5b illustrates another embodiment of coupler 20h. This coupler is similar to the embodiment of FIG. 5a in that it includes a coupler piston 32h which is slidably received in the body portion 21h. However, no springs support the coupler piston 32h, as the coupler piston 32h is free-floating. The coupler piston 32h has attached thereto rod-like extensions 100h and 101h which are slidably received in the body portion 21h. Bumpers 102h and 103h, preferably o-rings, cushion impact such that there is no direct contact between the coupler piston 32h and the body portion 21h in the axial direction. An orifice is shown; however, one may not be desired.

In summary, the present invention relates to a method and apparatus for restricting transient motions between an aircraft power member and an aircraft structural member. The apparatus includes a coupler for use in an inertial-type fluid mount and for installation in series-relationship with an inertia track of an inertial fluid mount containing an inertial fluid. The invention couples the supported and supporting members upon exceeding predetermined transient condition therebetween. In one embodiment, the coupler includes a body portion having a spring-positioned coupler piston located therein which is telescopically received. The coupler is located within the fluid flow path of the inertia track. The coupler piston snubs upon exceeding the predetermined condition to restrict completely, or limit further fluid flow, causing high stiffness and/or damping. In another aspect, the coupler does not include springs for supporting the coupler piston. And in yet another aspect, the coupler is used in aircraft engine fluid mounts, such as FTR systems, and fluid pylon isolators to restrict transient motions or resonances and/or to add damping when encountering same.

While the preferred embodiment of the present invention has been described in detail, various modifications, alterations, changes and adaptations to the aforementioned may be made without departing from the spirit and scope of the present invention defined in the appended claims. It is intended that all such modifications, alterations, and changes be considered part of the present invention.

What is claimed is:

1. An inertial-type fluid mount for attaching an aircraft power member to an aircraft structural member, comprising:

(a) housing means for attaching to said aircraft power member;

(b) inner member means for attaching to said aircraft structural member;

(c) a flexible element interconnected between said housing means and said inner member means causing a spring-like interconnection therebetween;

(d) a first fluid chamber;

(e) a second fluid chamber;

(f) an inertial fluid pathway connected between said first fluid chamber and said second fluid chamber for allowing inertial fluid flow therebetween;

(g) an inertial fluid contained within, and substantially filling, said first fluid chamber, said second fluid chamber and said inertial fluid pathway, said inertial fluid flowing along said inertial fluid pathway responsive to relative dynamic movement between said aircraft power member and said aircraft structural member and causing a tuned fluid inertia effect; and (h) a coupler positioned in series relationship with said inertial fluid pathway, said coupler including a body portion having a lip formed thereon, a coupler piston telescopically received within said body portion and having a seat formed thereon, said coupler piston being positioned perpendicular to said direction of flow of said inertial fluid within said inertial fluid pathway, and when a fluid flow velocity within said inertial fluid pathway is exceeded due to relative transient motions between said aircraft power member and said aircraft structural member, said seat on said coupler piston comes into contact with said lip on said body portion and causes a restriction of inertial fluid flow within said inertial fluid pathway thereby restricting further relative transient motion between said aircraft power element and said aircraft structural member.

2. An inertial-type fluid mount of claim 1 wherein said coupler piston includes an orifice formed therethrough and multiple metal springs for precompressing and supporting said coupler piston relative to said body portion.

3. An inertial-type fluid mount of claim 1 wherein said coupler piston includes extensions formed thereon for slidably interacting with said body portion, an orifice formed therethrough said coupler piston and said extensions, and o-ring bumpers for cushioning axial impact between said coupler piston and said body portion.

4. An inertial-type fluid mount of claim 1 wherein said seat on said coupler piston for interacting with said lip on said body portion has a shape selected from the group consisting of conical and round.

5. An inertial-type fluid mount of claim 1 wherein said seat formed on said coupler piston is flexible and elastomeric for cooperating with said lip on said body portion.

6. An inertial-type fluid mount of claim 1 wherein said coupler is included in an external inertia track in an aircraft Fluid Torque Restraint (FTR) system and snubs to limit vertical motions of said aircraft power member relative to said aircraft structural member under one selected from the group consisting of high load conditions encountered during landing and takeoff, lower-frequency engine resonant conditions encountered during landing and takeoff, and high load maneuver conditions.

7. An inertial-type fluid mount of claim 1, wherein said coupler is included internally within said inertial-type fluid mount and said aircraft power member is an aircraft engine and said aircraft structural member is one selected from the group consisting of an aircraft strut and an aircraft pylon, and said coupler, upon snubbing due to transient loads, restricts further motions of said aircraft power member relative to said aircraft structural member.

8. An inertial-type fluid mount of claim 1, wherein said coupler is included within a fluid pylon isolator which attaches between said aircraft power member which is a helicopter transmission and said aircraft structural member which is a helicopter fuselage, and said coupler further restricts transient motions of said aircraft power member relative to said aircraft structural member upon encountering large operating loads such as during one of a take off, landing and ground resonance condition.

9. An aircraft Fluid Torque Restraint (FTR) for attaching an aircraft engine to an aircraft structure, comprising:
(a) a first housing for attaching to said aircraft engine;
(b) a second housing for also attaching to said aircraft engine;
(c) a first inner member within said first housing and attached to said aircraft structure;
(d) a second inner member within said second housing and also attached to said aircraft structure;
(e) a flexible element interconnected between said first housing and said first inner member and interconnecting between said second housing and said second inner member and causing a spring-like interconnection therebetween;
(f) a first fluid chamber formed within said first housing;
(g) a second fluid chamber formed within said second housing;
(h) an inertial fluid pathway connected between said first fluid chamber and said second fluid chamber for allowing inertial fluid communication therebetween;
(i) an inertial fluid contained within and substantially filling said first fluid chamber, said second fluid chamber, and said inertial fluid pathway, said inertial fluid flowing in a direction along said inertial fluid pathway responsive to relative dynamic movement between said aircraft engine and said aircraft structure and causing a tuned fluid inertial effect coinciding with an operating frequency; and
(j) a coupler formed along said inertial fluid pathway, said coupler including a body portion having a lip formed thereon, a coupler piston slidably received within said body portion, said coupler piston having a seat formed thereon, said coupler piston being positioned perpendicular to said direction of fluid flow within said fluid pathway, said coupler piston being free-floating, and when an inertial fluid flow velocity within said inertial fluid pathway is exceeded due to relative vertical transient movements between said aircraft engine and said aircraft structure, said seat on said coupler piston comes interacts with said lip on said body portion and causes a restriction of flow of said inertial fluid within said inertial fluid pathway to further limit transient vertical motions of said aircraft engine relative to said aircraft structure during takeoff and landing conditions.

10. A Fluid Torque Restraint of claim 9, wherein said flexible element is a low-damped elastomer, said inertial fluid exhibits low kinematic viscosity, and said coupler piston has an orifice formed therein.

11. A helicopter fluid pylon isolator for attachment between a helicopter fuselage and a helicopter pylon, comprising:
(a) an inner member for attaching to said helicopter fuselage;
(b) a housing for attaching to said helicopter pylon;
(c) a flexible element interconnected between said inner member and said housing and causing a spring-like interconnection therebetween;
(d) a first fluid chamber formed within said fluid pylon isolator;
(e) a second fluid chamber within said fluid pylon isolator;
(f) an inertial fluid pathway connected between said first fluid chamber and said second fluid chamber for allowing fluid communication therebetween;
(g) an inertial fluid contained within and substantially filling said first fluid chamber, said second fluid chamber, and said inertial fluid pathway, said inertial fluid flowing in a direction along said inertial fluid pathway responsive to relative dynamic movement between inner member and said housing and causing a tuned inertial fluid effect for accomplishing isolation of said helicopter fuselage from said helicopter pylon; and
(h) a coupler formed in said inertial fluid pathway, and in series spring relationship therewith, said coupler including a body portion having a lip formed thereon, a coupler piston telescopically received within said body portion, said coupler piston having a seat formed thereon, said coupler piston being positioned perpendicular to said direction of inertial fluid flow within said inertial fluid pathway, and when an inertial fluid flow velocity within said inertial fluid pathway is exceeded due to relative movement between said inner member and said housing, said seat on said coupler piston cooperates with said lip on said body portion and causes a restriction of inertial fluid flow within said inertial fluid pathway further limiting relative transient movement between said helicopter fuselage and said helicopter pylon during ground resonance conditions.

12. A method for limiting transient takeoff and landing motions between an aircraft power element, such as an engine or transmission and an aircraft structure which include a fluid mount attached therebetween, comprising:

a) causing transient fluid flow between a first fluid chamber and a second fluid chamber of said fluid mount upon initially encountering one of said takeoff and landing wherein said fluid mount includes:

i) means for attaching to said power element, ii) means for attaching to said aircraft structure, iii) a flexible element interconnected between said power element and said aircraft structure, iv) an inertial fluid pathway connected between said first fluid chamber and said second fluid chamber having a seat formed therein, v) an inertial fluid contained within and substantially filling said first fluid chamber, said second fluid chamber and said inertial fluid pathway, vi) a coupler formed along, and positioned in series relationship with, said inertial fluid pathway, and b) restricting said transient fluid flow upon encountering fluid velocities above a predetermined threshold thereby causing said coupler to contact said seat and therein causing a restriction of fluid flow within said inertial fluid pathway thereby restricting further relative transient motion between said aircraft power element and said aircraft structure.

13. A method for limiting transient motions of claim 12 wherein said power element is a helicopter pylon and said aircraft structure is a helicopter fuselage and said fluid mount is a fluid pylon isolator.

14. A method for limiting transient motions of claim 12 wherein said power element is an aircraft engine and said aircraft structure is an aircraft strut.

15. A method for limiting transient motions of claim 12 wherein said power element is an aircraft engine and said coupler is within an aircraft Fluid Torque Restraint (FTR).

16. A fluid mount for attaching an aircraft power member to an aircraft structural member, comprising:

(a) housing means for attaching to said aircraft power member;

(b) inner member means for attaching to said aircraft structural member;

(c) a flexible element interconnected between said housing means and said inner member means causing a spring-like interconnection therebetween;

(d) a first fluid chamber;

(e) a second fluid chamber;

(f) a fluid pathway connected between said first fluid chamber and said second fluid chamber for allowing fluid flow therebetween;

(g) a fluid contained within, and substantially filling, said first fluid chamber, said second fluid chamber and said fluid pathway, said fluid flowing along said fluid pathway responsive to relative dynamic movement between said aircraft power member and said aircraft structural member; and (h) a coupler positioned in series relationship with said fluid pathway, said coupler including a body portion having a lip formed thereon, a coupler piston telescopically received within said body portion and having a seat formed thereon, said coupler piston being positioned perpendicular to said direction of flow of said fluid within said fluid pathway, and when a fluid flow velocity within said fluid pathway is exceeded due to relative transient motions between said aircraft power member and said aircraft structural member, said seat on said coupler piston comes into contact with said lip on said body portion and causes a restriction of fluid flow within said fluid pathway thereby restricting further relative transient motion between said aircraft power element and said aircraft structural member.

\* \* \* \* \*